Figure 4:
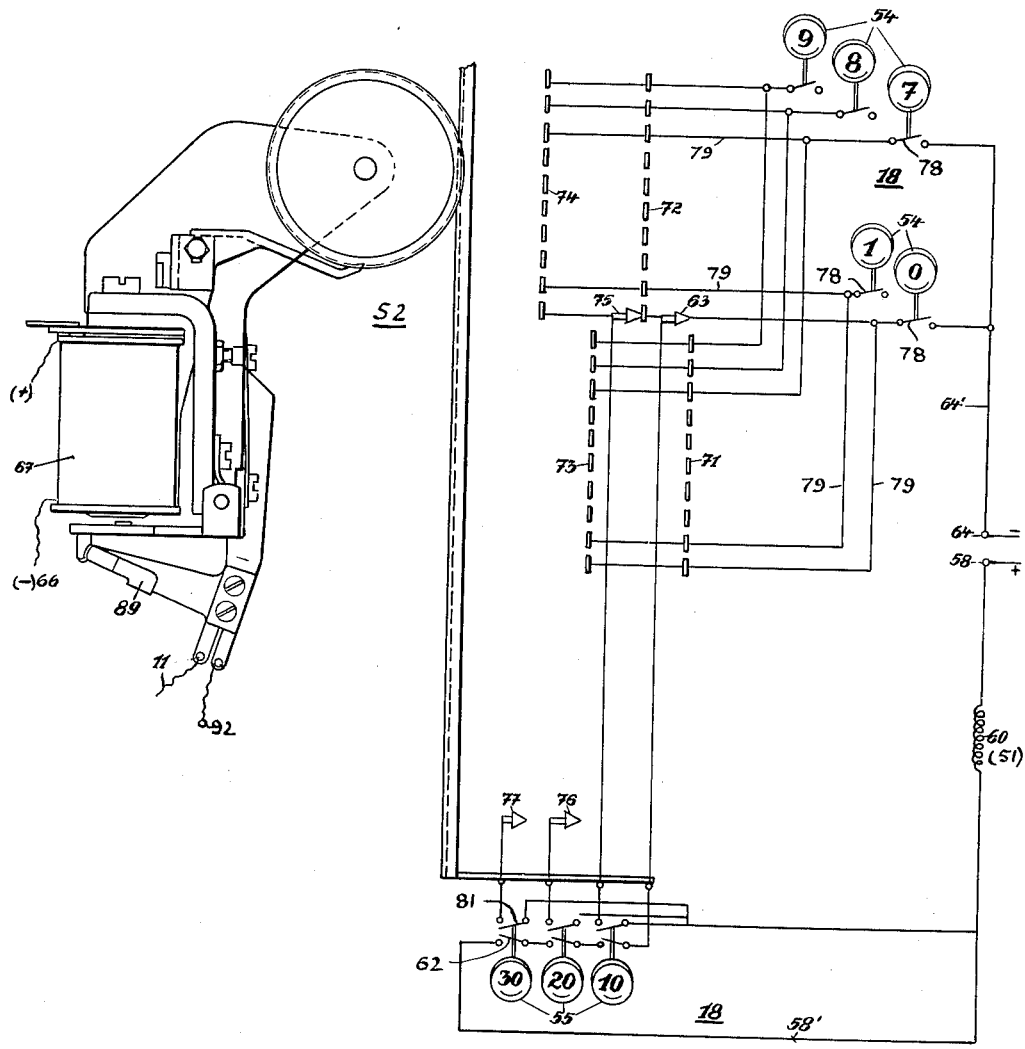

June 22, 1954     H. K. HACK     2,682,046
PULSE PRODUCING CONTROL APPARATUS
Filed July 26, 1951     3 Sheets-Sheet 1
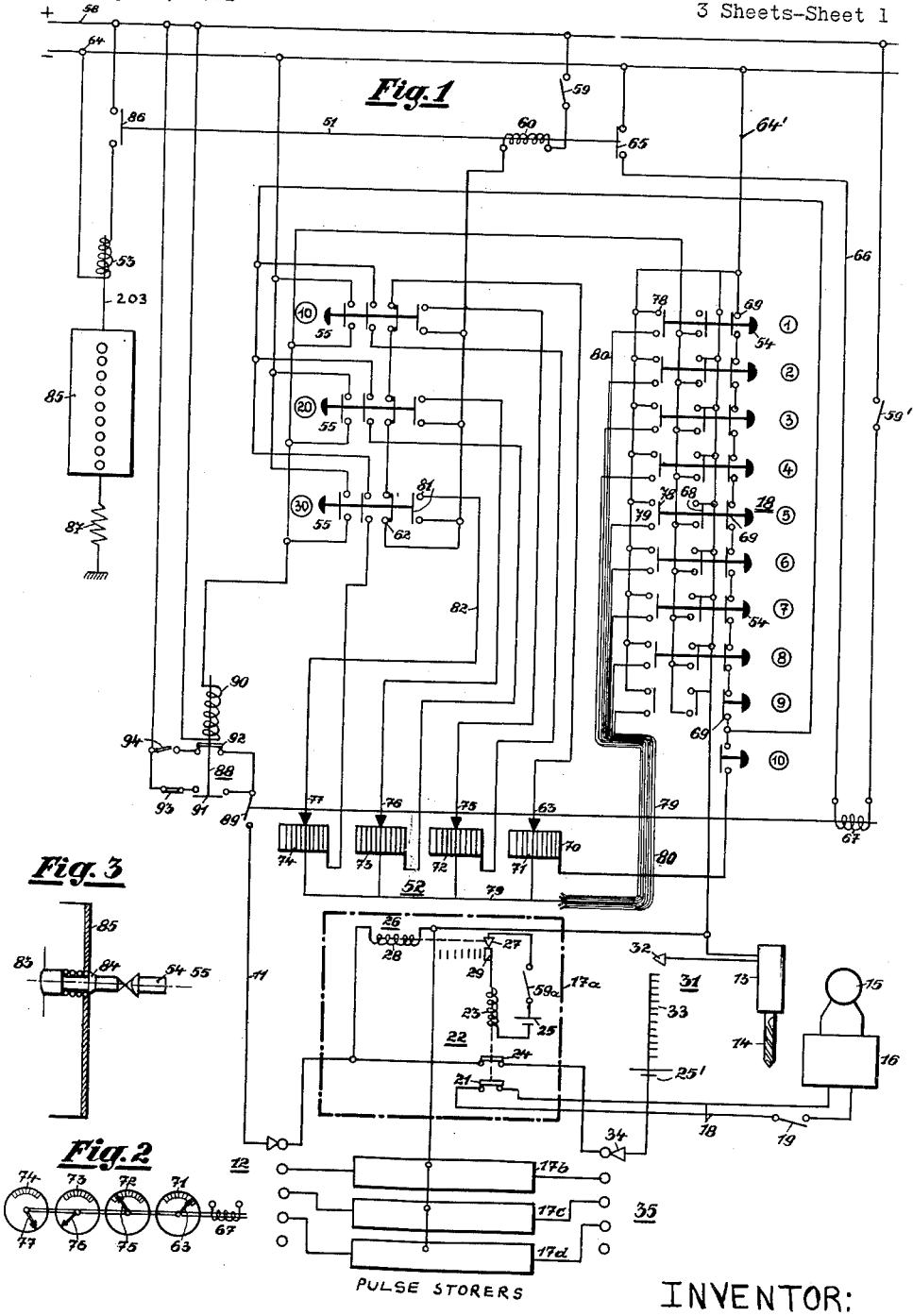
INVENTOR:
Heinrich Karl Hack June 22, 1954  H. K. HACK  2,682,046
PULSE PRODUCING CONTROL APPARATUS
Filed July 26, 1951
3 Sheets-Sheet 2

INVENTOR:
Heinrich Karl Hack

Patented June 22, 1954

2,682,046

UNITED STATES PATENT OFFICE 2,682,046

PULSE PRODUCING CONTROL APPARATUS

Heinrich Karl Hack, Gross Zimmern, near Darmstadt, Germany, assignor to Carl Schenck Maschinenfabrik Darmstadt G. m. b. H., Darmstadt, Germany, a corporation of Germany Application July 26, 1951, Serial No. 238,650

Claims priority, application Germany August 4, 1950

12 Claims. (Cl. 340—363)

My invention relates to electric pulse producing apparatus for performing a control operation in accordance with predetermined intelligence, and particularly but not exclusively to pulse transmitting apparatus for controlling machine tools or the like processing machinery in dependence upon predetermined control magnitudes.

It is an object of my invention to devise control apparatus capable of translating given magnitudes, including those of a plurality of digits, into respective trains of uniformly consecutive pulses with a high velocity and high reliability of operation so as to be suitable for exacting control requirements such as to be satisfied, for instance, for the accurate control of machine tools.

Another object of the invention is to provide control apparatus of the just-mentioned kind that are capable of rapidly storing a number of different control magnitudes to be made individually available for control purposes at some later stage of operation.

According to my invention, I provide a pulse controlling device (initial transmitter) which has a plurality of selectively actuable contact means, or groups of such contact means, corresponding to the digit values of the magnitudes to be transmitted, and I connect with the initial transmitter a plural-stage stepping switch mechanism in which a separate bank of contacts with an appertaining slide contact is correlated to each group of transmitter contact means and so staggered relative to the other banks of the same mechanism that all banks are sequentially effective to totalize the digit values into a train of consecutive pulses whose total number of pulses is the sum of the digit values.

According to other features of the invention, the initial transmitter is designed as a multiple switching device, preferably with a decadic or other digit arrangement of selectively actuable push button switches. The push button switches pertaining to the lowest decade (or digit group) have normally closed contact elements serially interconnected between one pole of an energizing current source and the zero-point bank contact of the stepping switch mechanism, while the other pole of the current source is connected with the slide contact of the lowermost stage of the stepping switch mechanism through the coil of a normally energized main control relay and through normally closed contact elements of the higher-decade (or digit group) push button switches; the drive of the stepping switch mechanism being controlled by a contact of the main control relay to operate when the relay is de-energized.

By virtue of a thus organized apparatus, the invention affords the advantage that any number of pulses, within the available limits, and any number of successive pulse trains can be issued in a very rapid sequence and becomes available for control purposes. If, according to another feature of the invention, a pulse storing device is connected with the above-mentioned stepping switch mechanism, the initial transmitter after each use, is immediately available for another pulse transmission regardless of whether or not the previously issued pulse train has already served its purpose.

According to still another feature of my invention, the circuit of the pulse issuing contact of the above-mentioned stepping switch mechanism is controlled by a pulse control relay whose coil is connected with the contact means of the initial transmitter so that a transmission of a pulse train occurs only during part of the stepping travel of the stepping switch mechanism, namely either from the start of travel to a point determined by the magnitude setting of the initial transmitter or from that point to the end of a full travel of the mechanism.

Figure 5:
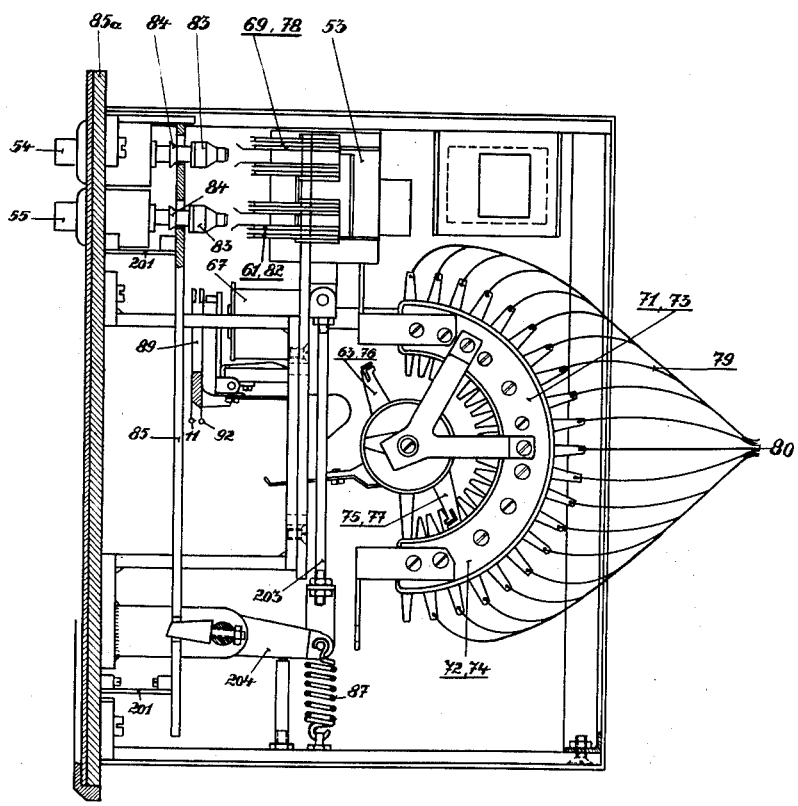

The foregoing and other objects and features of the invention will be apparent from the following description of the embodiment exemplified by the drawings in which Fig. 1 is a schematic circuit diagram of an apparatus for controlling a machine tool, Figs. 2 and 3 are schematic illustrations of details of the same apparatus, Fig. 4 shows separately and partly in a schematical manner the selector and pulse transmitting portion of the apparatus, and Fig. 5 is a different view of the same apparatus portion.

The electrical control pulses to be issued by the illustrated apparatus are originally controlled by means of a multiple switching device 18 (initial transmitter) equipped with individual contact means such as push button switches 54, 55 which are to be selectively actuated by the operator and have corresponding indicia indicative of the respective values. Since the values to be translated into electrical pulses are often represented in addenda groups such as the digit positions of a number, a similar grouping is preferably given to the individual switch units of the initial transmitter. For instance, as illustrated, when the pulses to be issued are representative of numbers, the initial transmitter has a plurality of groups representing the units, tens and hundreds values and so forth of the number. The switches 54 pertaining to the lowest-value group cause the issuance of pulses indicative of numerical values between 0 and 9 (units decade), these ten switches being correspondingly marked by the indicia (0) to (9). The next group of individual switches in the initial transmitter represent the next higher digits beginning with the value ten, one of these switches being provided for each decade. These tens switches 55, indexed (10), (20), (30), cause the issuance of as many pulses as correspond to the tens value of the individual switch. For instance, the switch 55 of the third decade, designated by (30), causes the issuance of thirty pulses. Only three individual tens switches 55 are shown although it will be understood that switches for additional decades may be provided and that the initial transmitter may also be equipped with similar switches for a hundreds group and so forth. A switch representing the number 200, for instance, would cause the issuance of 200 pulses. It is obvious that the subdivision into groups can be effected in accordance with the requirements of any desired application and may be in accordance with a number system other than the decimal system or may be based on other than numerical principles.

The pulse generation proper is effected by a stepping-switch mechanism 52 which is started and controlled by the initial transmitter 18. The stepping-switch mechanism may consist of any known devices suitable for such purposes (see, for instance, H. Pender and K. McIlwain, Electrical Engineer's Handbook, Electric Communication and Electronics, third edition, section 20, pages 20 and 21, published by J. Wiley & Sons, New York). Rotary stepping switches are especially well applicable, provided they are included in the system in the following manner. A rotary stepping switch is equipped with banks of spring contacts whose free ends are engaged by a slide contact travelling from bank contact to bank contact and causing each time the issuance of a current pulse. Movement is imparted to the slide contacts by an electromagnetic stepping drive with a drive coil 67. In order to use such a rotary stepping switch or a similar device, for instance, in a remote metering mechanism, this device is subdivided into groups basically in the same manner as the initial transmitter, and the individual groups of divisions are correlated to the value groups of the initial transmitter. If a rotary selector switch of conventional design is used, this selector switch is given just as many value groups as the initial transmitter. Since in the illustrated embodiment, the initial transmitter has four decades, the selector switch mechanism is likewise equipped with four switch units with respective banks of contacts 71, 72, 73 and 74. This is done in such a manner that, counting from the entrance of the slide contacts, the banks of contacts are disposed in a staggered arrangement, such an arrangement is shown in Fig. 2 and also apparent from Fig. 4. The first bank 71 corresponding to the lowest value group, i. e. to the unit decade has ten bank contacts representing the values 0 to 9. The pertaining slider 63, after having passed over the last bank contact, continues its travel while running idle. However, as soon as the slider 63 leaves the last contact, the second slider 75 pertaining to the next value group comes into contact engagement with the first bank contact of the first tens decade bank 72. The ten bank contacts representing the values 10 to 19 are staggered behind the unit decade, so that the pertaining slider 75 travels idle when the unit slider 63 passes along its bank of unit contacts but enters into contact engagement with the bank of tens contacts immediately after the unit slider 63 has left the last contact of the unit decade. The other groups of contact banks of the selector switch are similarly staggered and similarly connected into the electric system.

A direct current source has its positive bus 58 connected through a switch 59 with the coil 60 of a main control relay 51 (Figs. 1, 4). Switch 59 must be closed to prepare the system for operation and has another contact 59a which is then also closed. The circuit of coil 60 extends through a break contact 62 of each tens push button 55 to the contact slider 63 of the first decade in stepping switch 52. The negative bus 64 of the direct current supply is connected through a break contact 65 of relay 51 (Fig. 1) and through a lead 66 with the actuating coil 67 of the stepping switch 52, the other end of coil 67 being connected with the positive direct current bus 58 through a switch 59' which must be closed to set the apparatus in operative condition. The negative bus 64 is also connected through a lead 64' and a make contact 69 of each unit push button 54 with the zero-point contact 70 of the first decade in the stepping switch 52. In this manner, the zero position of the system is definitely established. That is, the stepping switch 52, when actuated by the coil 67 of its stepping drive, will incrementally advance until the slider 63 reaches the contact 70. When that position is reached, coil 60 of main relay 51 becomes energized in the circuit 58—59—60—all contacts 62—63—70—all contacts 69—68—64. Relay 51 then opens its break contact 65 and deenergizes the drive coil 67 of the stepping switch 52 thus stopping the stepping switch in the zero position then reached. Hence, at the start of each course of operations, the stepping switch mechanism 52 is set to zero.

A pulse contact 89 (Figs. 1, 4, 5) of the stepping switch 52 closes its circuit once for each individual step movement of the switch and thus issues, during each operation, a number of pulses equal to the total number of steps. The circuit of pulse contact 89 extends through the contact 91 of a pulse control relay 88 so that the pulses are transmitted only when relay 88 is energized.

The normally open contact elements 78 of each unit push button 54 connect, when closed, the minus pole (bus 64 and lead 64') to a particular one of the bank contacts in each of the four contact banks 71 to 74 of the stepping switch 52 (Figs. 1, 4). The circuit connections extend through a manifold connector 80 of whose conductors only one is separately shown and designated by 79 in Fig. 1, while several of the conductors 79 are shown in Fig. 4. The conductor 79 shown in Fig. 1 connects the contact element 78 of only one push button 54, namely the one indexed (5), with the No. 5 bank contact in bank 71, also with the No. 5 contact in bank 72, and with the corresponding one contact in each of banks 73 and 74. Similarly, each of the other conductors 79 of the manifold connector 80 connects one of the respective contact elements 78 with one correlated contact in each of banks 71 to 74. The remaining one contact in each of banks 71 to 74, this remaining contact corresponding to the zero value of the bank, is connected through a normally open contact element of one of the respective tens push button switches 55 with a circuit point between the zero-indexed push button 55 and the normally closed contact element 69 of the next adjacent push button 55 (Fig. 1).

Assume that the unit push button 54 indexed (5) is depressed by the operator (Fig. 1). Then the break contact element 69 of that push button disconnects the minus pole (negative bus 64 and lead 64') from the zero contact 70 of bank 71. Instead, the make contact element 78 of the same push button now connects the minus pole through conductor 79 of the manifold connector 80 to the one correlated No. 5 contact of all four decades of bank contacts. The coil 60 of main relay 51, previously energized in the circuit 58—59—60—62—63—70—69—64'—64, becomes deenergized due to the opening of the contact element 69 of the depressed push button. Hence relay 51 drops out and, by closing its contact 65, passes current through drive coil 67 of the stepping switch mechanism 52. The mechanism displaces its slide contacts until the slide contact 63 again coincides with the displaced minus pole, that is until the slide contact 63 reaches the bank contact No. 5 in bank 71. At that moment, the coil 60 in main relay 51 receives a current pulse through the now completed circuit 58—59—60—62—63 bank contact No. 5 of bank 71—79—78—64'—64. Relay 51 picks up and opens at contact 65 the circuit of stepping switch drive coil 67.

The adjustment of the stepping switch mechanism 52 to any other unit value is analogous to the performance just described. The actuation of any one push button 54 or 55 causes the pulse control relay 88 to be energized which controls the further transmission of the current pulses as will be explained.

To register, for instance, a two-digit magnitude, one push button in each of the respective unit and tens rows is to be depressed. Assume, for instance, that the magnitude to be registered has the value (33). Then the tens push button 55 representing the value (30) and the unit push button 54 representing the value (1) are to be depressed. This may be done in any sequence. The operation initiated by the actuation of these two contacts will be explained first with reference to Fig. 1. When the button 55 indexed (3) is depressed, the positive bus 58 of the direct current supply is connected through the make contact 81 and through lead 82 with the slide contact 77, thus selecting the decade bank 74 of stepping switch 52. Assuming that the likewise depressed unit push button represents the value (1), the negative bus 64 is now disconnected from the zero-point contact 70 of contact bank 71 due to the opening of break contact 69, and this zero point is shifted by the closing of make contact 78 to the corresponding contact in the bank of the decade 74. Consequently, the stepping switch mechanism 52 will now operate to shift the slide contact 77 relative to its contact bank until the slide contact has found the zeroed bank contact. The number of individual switching steps corresponds to the numerical value represented by the actuated push buttons. Hence, the desired number of pulses is issued.

Regardless of which push button is depressed, the pulse control relay 88 is always switched in. Therefore, the sequence of push button actuation has no effect on the pulses summation effected by the stepping mechanism. The operation just described is also apparent from Fig. 4. In this illustration the contact banks 71 to 74 are shown developed and separate from the pertaining rotary stepping mechanism 52, and the pertaining slide contacts 63, 75, 76, 77 are shown to travel upwardly on a linear path, although of course the banks and slide paths are actually circular as apparent from Figs. 2 and 5. It should further be understood that while Fig. 4 shows only the circuit for coil 60 of relay 51, the circuits or circuit portions not shown in this illustration are in accordance with Fig. 1. Viewing Fig. 4, it will be recognized that, when the stepping mechanism 52 is in operation, the slide contacts 63, 75, 76, 77 travel sequentially along the respective banks 71 to 74 as explained in the foregoing. Reverting to the above-assumed example, consider again what happens when the tens push button 55 for value (30) and the unit push button 54 for value (1) are depressed. The depressed unit push button (1) closes its contact 78 and thereby connects the negative bus 64 through the pertaining leads 79 with the No. 1 contact in each of the four banks 71 to 74. Due to the fact that contact 81 of the push button value (30) is now closed, the positive bus 58 is connected through the coil 60 of relay 51 and through contact 81 with the slider contact 77. When now the stepping mechanism operates in the manner described in the foregoing, all slide contacts move from their zero position until the one slider carrying the positive potential, that is the slider 77, arrives at No. 1 contact of the pertaining contact bank 74. Due to the staggered arrangement of the four-switch units this condition is reached only after the slider 63 has travelled from its zero position over its bank 71, and after the slider 75 has subsequently passed over the entire bank 72, and the slider 76 has passed over the entire bank 73. Consequently, a total number of thirty-one steps from the zero position is required to have the slider 77 reach the No. 1 contact of bank 74. As soon as this happens, slider 77 closes the circuit from the positive bus 58 through relay coil 60 to the negative bus 64. Consequently, relay coil 60 becomes excited and operates the relay contacts 65 and 86 (Fig. 1) to stop the stepping drive and to release the selector push buttons. If the magnitude selected by the actuation of the push buttons lies within a different numerical decade, then the positive potential is applied to the corresponding other slide contact 63, 75 or 77 so that the stepping mechanism is stopped at the proper point of travel, the operation being otherwise as described with reference to the example of magnitude (31).

Each of push button contacts 54 and 55 is equipped with a pressure member 83 (Figs. 3, 6) which is coaxially arranged relative to the push button and has a conical shoulder 84 engageable with a movable slide 85 (Figs. 1, 3, 5). Slide 85 retains the pressure member 83 together with the pertaining push button in the depressed position until the desired number of pulses is totalized by the stepping switch. Then the make contact 86 of main relay 51 (Fig. 1) applies a pulse to the release magnet 53 (Figs. 1, 5) which raises the slide 85 against the force of a spring 87 so that the pressure member 83 and the pertaining push button can spring back to the normal position. During this return movement of the push button, the pulse control relay 88 immediately interrupts the transmission of pulses. Simultaneously, the minus pole is again connected with the zero contact 70 of bank 71. This causes the stepping switch 52 to operate until the slide contact 63 again reaches the zero point. Thereafter, the stepping switch is again available for a new adjustment. It will be understood that, while in Fig. 1 the slider 85 is shown separate from the push button switches 54 and 55, it is, of course, joined with each of these switches in the manner shown in Fig. 6.

In Fig. 6, the slider 85 is shown guided for motion by means of leaf springs 201, and the release magnet 53 is shown connected with the slide 85 by a rod 203 and a lever 204.

The pulse control relay 88 (Fig. 1) may be given a make contact, a break contact, reversing contacts, or any number and arrangement of such contacts. In the illustrated embodiment, the relay 88 is shown to have a make contact 91 and a break contact 92, one of which may be selected for operation by closing a pertaining switch 93 or 94. When the pulse control relay is equipped with a make contact, or when in the illustrated embodiment switch 93 is closed and switch 94 open, as shown, then the make contact 91 closes a circuit for pulse contact 89 as soon as any one push button of the initial transmitter is actuated and thereafter opens the transmission circuit when the last actuated push button springs back to its rest position. Under these conditions, the stepping switch mechanism 52 issues the pulses during its forward travel from the zero position to the position corresponding to the selected setting of the initial transmitter 18.

On the other hand, when the pulse control relay 88 has a break contact, or when in the illustrated embodiment switch 93 is open and switch 94 closed, the transmission circuit remains open at contact 92 while the stepping mechanism 52 travels from the zero position to the position determined by the setting of the initial transmitter and is closed only when the last actuated push button springs back to its rest position. The stepping switch mechanism 52 then issues the pulses to the circuit to be controlled during the remaining travel period of the stepping switch mechanism, that is, while this mechanism is moving back to zero from the position determined by the initial transmitter.

When the pulse control relay 88 operates as a reversing switch, the respective trains of pulses occurring during the first travel period and the remaining travel period of the stepping mechanism may be transmitted to separate pulse-receiving circuits. By virtue of these possible modifications of relay 88, the invention can readily be adapted to a large variety of applications.

In the illustrated embodiment, the above described apparatus is used for controlling the operation of a machine tool in dependence upon the trains of pulses issued by the stepping switch mechanism under control by the pulse control relay. The machine tool is exemplified by a drill press. The axially displaceable tool carrier 13 of the press is equipped with a drill 14 whose drilling depth relative to a work piece to be machined is to be controlled by the trains of pulses. Such a machine tool control is described more in detail in my copending application Serial No. 238,649, filed July 26, 1951 and assigned to the assignee of the present invention. The following description and the corresponding illustration on the drawing are directed only to the basic control circuits essential for a complete representation and understanding of the present invention. If desired, reference may be had to the copending application as regards details beyond the scope of the present invention.

In the drawing the drive motor for the drilling tool is not illustrated, this motor being assumed to be operating during the feed movement and control performance described presently. The tool feed motor 15 of the machine tool is energized through any suitable control system, schematically shown at 16, under control by a circuit 18 whose switch 19 when closed causes the feed motor 15 to move the revolving drilling tool toward the work piece, provided a normally open relay contact 21 in control circuit 18 is also closed. Contact 21 pertains to a feed control relay 22 whose control coil 23 actuates also a normally closed contact 24. The relay 22 is part of a pulse storing unit 17a which is connected between the positive and negative current supply buses 58 and 64 of the system through the impulse transmission circuit 11 and through a selector switch 12. A number of additional pulse storing units, such as those schematically shown at 17b, 17c and 17d may be provided, only one of the storing units being connected to the pulse transmitting portion of the system at a time. Details of the storer units 17b, 17c, 17d are not shown because each of these units may be identical with the unit 17a now to be further described.

The coil 23 of feed control relay 22 in storer unit 17a is energized from a suitable current source 25 under control by a switch contact 59a which forms part of the above mentioned main switch 59 and is closed when the system is in operative condition. The source 25, of course, may be identical with the above mentioned supply buses 58 and 64. The pulse storing device proper of unit 17a consists in a stepping switch unit 26. Unit 26 has a progressively movable slide contact 27 controlled by a stepping drive whose coil is denoted by 28. The stepping switch unit 26 is preferably of the rotary type and has as many step positions as are needed to take care of the maximum number of pulses that may be issued to the transmission circuit 11 during any one pulse train. For instance, since the initial transmitter of the illustrated embodiment is capable of causing the issuance of pulse trains with up to forty pulses, the stepping switch unit 26 must have forty consecutive steps. When the slide contact 27 of unit 26 is in the zero position, as shown, it engages a stationary contact 29 and causes coil 23 of feed control relay 22 to be energized. Consequently, when the system is in operative position and the selected storer is set to zero, the relay contact 21 is open and the feed motor 15 cannot be switched in. In all other positions of the stepping switch unit 26, the coil circuit of feed control relay 22 is open so that the feed motor 15 may then be energized by closing the switch 19. This, of course, is to be done only after the storing unit is in condition for operation, a fact which may be signalled to the operator by a signal lamp (not illustrated).

The machine tool is equipped with a pulse contact device 31 which has a slide contact 32 slidably coupled with the tool carrier 13 and sequentially engageable with a series of stationary interrupter contacts 33 which are connected through the displaceable contact 34 of a selector switch 35 with one of the pulse storer units 17a to 17d. When the tool carrier 13 is in its rest position and the tool out of engagement with the work piece, the contact 32 is remote from the stationary contacts 33. When the tool, during its forward feed movement, approaches the work piece, the contact 32 starts passing over the contacts 33 and then interrupts the circuit each time when passing from one to the next stationary contact, thus issuing to the selected storer unit a number of pulses according to a travel characteristic corresponding to the drilling depth or to the amount of material removed from the work piece. The mutual spacing of the stationary interrupter contacts 33 may be graduated in accordance with a desired law of progression.

Assuming that the storer unit 17a is connected by switch 12 with the transmission circuit 11 as illustrated, and that the initial transmitter 18 and the stepping mechanism 52 are effective to issue a train of pulses to the circuit 11 in the above described manner, then the storer unit 17a will operate as follows. The train of pulses is applied to coil 28 of stepping unit 26. This unit receives the aggregate total of pulses issued during the slider travel of the stepping switch mechanism 52, for instance, from the zero position of this mechanism to the position corresponding to the setting of the initial transmitter. Consequently, the slider 27 of stepping switch unit 26 moves from zero to a position indicative of the total number of pulses. The storer unit 17a is then ready for control of the machine tool but need not immediately be used. If desired any other storer unit may first be charged with a train of pulses by correspondingly adjusting the selector switch 12. For instance, when it is desired to subject the work piece to a number of machining operations in accordance with previously measured or otherwise determined control magnitudes, the work piece may first be subjected to a complete sequence of measuring operations. The respective magnitudes then observed may be given into the initial transmitter, each time setting the selector switch 12 to a different position so that each individual magnitude is registered in one of the respective pulse storing units 17a to 17d. When thereafter the work piece is transferred to the machine tool or tools, these machines are sequentially connected by the switch 35 with the corresponding storer units.

Assuming that the machine tool is connected through switch 35 to the storer unit 17a as illustrated, the operation of the machine can now be controlled by closing the switch 19. Since, at that stage of operation, the stepping switch unit 26 has its slider 27 set to a position away from the zero contact 29, the relay 22 is deenergized and contact 21 is closed. Hence, the feed motor now operates to advance the revolving drill toward the work piece. When the work piece is reached, the pulse contact device 31 comes into operation and issues pulses through contact 24 to the stepping drive coil 28 thereby resetting the storer unit 26 to the zero position. When the number of pulses thus issued by device 31 corresponds to the number of pulses previously stored in unit 17a, the slider 27 reaches the zero contact 29 and causes relay 22 to stop the feed motor by opening the contact 21. After resetting the machine tool, this machine or any other desired machine may be connected to the next storer unit.

The stepping switch unit 26 may consist of a conventional rotary switch of unidirectional progression. In that case, the pulses to be stored advance the slider from the zero contact 29 to a position depending upon the number of pulses received and, when the storer is being reset by pulses from the contact device 31 of the machine tool, the slider continues advancing in the same direction until it completes one full rotation ending at the zero contact 29. For this type of control the magnitude to be registered on the initial transmitter 18 must be translated into the proper differential value. For instance, when the storer unit has a total of forty steps and the magnitude to be applied for control of the machine tool is fifteen, then the initial transmitter must be set to the difference between forty and fifteen i. e. to the value twenty-five.

In summary, a complete control apparatus as shown in Fig. 1 and described in the foregoing may perform the sequence of operations apparent from the following example. Assume that the machine tool serves to drill a hole into a rotor-type work piece for the purpose of removing a mass unbalance previously determined and indicated by an unbalance-measuring instrument. Then the operator depresses one or several of the selector push buttons 54, 55 in accordance with the measured unbalance value. The stepping mechanism 52 now advances its slide contacts until the slide contacts of the proper decade reach the proper unit point within that decade. At that moment the stepping mechanism is stopped and the selector push buttons are released and reset. Immediately thereafter the stepping mechanism resumes its advancing movement until it reaches the zero position. During the reset travel from the selected unit point to the zero position, the pulse contact 89 of the stepping mechanism is connected in relay 90 with the storer unit 17a so that the slider 27 in the stepping switch of the storer unit advances to a point determined by the number of pulses produced by contact 89 during the reset travel of mechanism 52. Thereafter, the storer unit 17a may be disconnected from the pulse transmitter, and another storer unit 17b, 17c or 17d may be similarly actuated by further trains of pulses issuing from the transmitting device. With storer unit 17a thus prepared, the machine tool motor 15 is put in operation and the drill advances toward the work piece. As soon as the drill starts removing material from the work piece, the contact device 31 issues pulses to the storer unit 17a thus resetting the storer to its zero position. When that position is reached, the storer relay 23 is energized and disconnects the motor 15 so that the drilling operation is stopped. The amount of material then removed is in accordance with the magnitude previously set by means of the push buttons 54, 55 and hence reduces the measured unbalance component of the work piece.

It will be obvious to those skilled in the art upon a study of this disclosure that my invention permits of a large variety of modifications and applications and may be embodied in apparatus other than those specifically described and illustrated, without departing from the gist of the invention and within the scope of the claims annexed hereto.

I claim:

1. Control apparatus for issuing trains of pulses in accordance with control magnitudes, comprising a multiple switching device having selectively operable contact groups corresponding to respective addenda groups of said magnitudes and having a stepping switch with banks of contacts and pertaining respective slide contacts corresponding in number to the number of said groups, said banks being staggered relative to said slide contacts for sequential operation, and said stepping switch having a pulse contact for issuing a train of pulses corresponding to the aggregate total of step movements, an electromagnetic stepping drive in said stepping switch, current supply buses, a control relay having a break contact connecting when closed said drive with said buses for causing said drive to actuate said stepping switch, an energizing circuit extending through said control relay and through said contact groups and between the slide contact and the lowermost bank contact of the bank corresponding to the lowermost addenda group whereby said stepping switch is normally locked in a zero position corresponding to said latter bank contact and operable to move to another position depending upon which individual contact in said respective contact groups is actuated at a time, and circuit means connected with said pulse contact to be controlled by said train of pulses.

2. In apparatus according to claim 1, each contact of said contact groups having a normally closed contact element connected in said energizing circuit so as to disconnect said energizing circuit from said lowermost bank contact when any one of said group contacts is actuated, and each of said contacts of said groups having a normally open contact element, said normally open elements of said lowermost group of contacts being individually connected to different bank contacts other than the zero contact in all of said contact banks, and said normally open elements of each other contact group being connected to the respective zero contacts of the other contact banks respectively.

3. Apparatus according to claim 1, comprising a pulse control relay having contact means and a coil for controlling said contact means, said coil being series connected with all individual contacts of said contact groups to be controlled in dependence upon actuation of any one of said group contacts, and said contact means being connected with said pulse contact for causing said train of pulses to be effective upon said circuit means only during a given travel portion of said stepping switch.

4. In apparatus according to claim 1, said contacts of said contact groups in said switching device having spring-biased push-button members respectively, a locking device having a spring-biased slide lockingly engageable with said push-button members in the actuated position of said members, and an electromagnet connected with said slide for moving it in opposition to its bias to releasing position, said magnet having an energizing circuit connected with said control relay, said energizing circuit being closed in said control relay only when said control relay is energized.

5. In apparatus according to claim 1, said contacts of said contact groups in said switching device having respective spring-biased push button members, a locking device having a spring-biased slide lockingly engageable with said push-button members in the actuated position of said members, an electromagnet connected with said slide for moving when energized said slide in opposition to the slide bias to button releasing position, said magnet having an energizing coil circuit, and said control relay having a normally open contact series connected in said coil circuit for energizing said magnet when said control relay is energized.

6. Control apparatus for issuing trains of pulses in accordance with control magnitudes, comprising a multiple switching device having selectively operable contact groups corresponding to respective addenda groups of said magnitudes and having a stepping switch with banks of contacts and with respective slide contacts corresponding in number to the number of said groups, said banks being staggered relative to said slide contacts for sequential operation and said stepping switch having a pulse contact for issuing a train of pulses corresponding upon the aggregate total of step movements, an electromagnetic stepping drive in said stepping switch, current supply buses, a control relay having a break contact buses connecting when closed said drive with said buses for causing said drive to actuate said stepping switch, each of said contacts of said contact groups having a normally closed first contact element and a normally open second contact element and a normally open third contact element, an energizing circuit connected with said control relay serially through said first contact elements and extending between said slide contact of the first bank corresponding to the lowermost addenda group and the zero contact of said first bank, said energizing circuit having a branch extending parallel to said first contact elements and comprising a manifold connection and individual conductors, said manifold connection joining said individual second contact elements of the contact group corresponding to the lowermost addenda group with respectively different bank contacts other than the zero contact of each of said banks, said individual conductors connecting said remaining contacts with said respective third contact elements, and circuit means connected with said pulse contact to be controlled by said train of pulses.

7. In apparatus according to claim 6, each of said contacts of said contact groups having a normally open fourth contact element, a pulse control relay having a coil circuit series connected with each individual one of said respective fourth contact elements to be energized when and as long as any one of said group contacts is in actuated position, said pulse control relay having a relay contact series connected with said pulse contact, and locking means engageable with said group contacts for holding the actuated group contacts in actuated position, said locking means having a releasing circuit connected with said control relay for releasing said actuated group contacts when said control relay is energized.

8. Control apparatus for issuing trains of pulses in accordance with a control magnitude, comprising an initial transmitter having selectively operable contact means arranged in groups corresponding to respective digital positions of the control magnitude to be transmitted, a rotary stepping switch mechanism having for each of said groups a switch unit comprising a bank of contacts and a unidirectionally movable slide contact, said mechanism having a pulse contact operable once for each step of rotation and having stepping drive means, said switch units being mutually displaced in staggered relation to one another so as to operate sequentially whereby said pulse contact is caused to issue a train of consecutive pulses, circuit means connecting said transmitter contact means through respective contacts of said banks and through said respective slide contacts with said drive means to move said stepping switch mechanism to a position corresponding to said control magnitude, a pulse transmitting circuit connected with said pulse contact, a locking device engageable with said contact means for holding each selectively actuated contact means in actuated position, said locking means having a release circuit connected with said stepping switch mechanism for releasing said actuated contact means when said stepping mechanism reaches said position, a pulse control relay having a coil and a relay contact controlled by said coil, said coil being series connected with all individual contacts of said contact groups to be controlled in dependence upon actuation of any one of said group contacts, and said relay contact being connected with said pulse contact for causing it to transmit pulses to said transmission circuit during only a portion of said rotation determined by said position.

9. In apparatus according to claim 8, said relay contact being normally open and series connected with said pulse contact in said transmitting circuit so that said transmitting circuit receives pulses from said pulse contact when said pulse control relay is energized from the starting moment of said stepping mechanism up to said position.

10. Control apparatus for issuing trains of pulses in accordance with control magnitudes, comprising a multiple switching device having selectively operable contact groups corresponding to respective addenda groups of said magnitudes and having a stepping switch with banks of contacts and pertaining respective slide contacts corresponding in number to the number of said groups, said banks being staggered relative to said slide contacts for sequential operation and said stepping switch having a pulse contact for issuing a train of pulses corresponding upon the aggregate total of step movements, an electromagnetic stepping drive in said stepping switch, current supply buses, a control relay having a break contact connecting when closed said drive with said buses for causing said drive to actuate said stepping switch, an energizing circuit extending through said control relay and through said contact groups and between the slide contact and the lowermost bank contact of the bank corresponding to the lowermost addenda group whereby said stepping switch is normally locked in a zero position corresponding to said lowermost bank contact and operable to move to another position depending upon which individual contact in said respective contact groups is actuated at a time, a plurality of pulse storing means each comprising an individually operable stepping switch unit, a selector switch connecting said pulse contact with said switch units for applying said trains of pulses to a selected one of said units, and circuit means connected with said respective units to be controlled in dependence upon the stored trains of pulses.

11. Control apparatus for issuing trains of a desired number of pulses, comprising an initial transmitter having selector contact means corresponding to respective digital positions of the pulse number to be transmitted, a stepping switch mechanism having for each of said digital positions an individual switch unit comprising a bank of contacts and a slide contact sequentially engageable with the contacts of said bank, said slide contacts of said switch units having a given zero position and being unidirectionally movable from said position through a given cycle of steps, said switch units having a common stepping drive, a pulse transmitting circuit having a pulse contact connected with said slide contacts to operate once for each step of travel, said switch units being mutually displaced in staggered relation to one another so as to operate sequentially whereby said pulse transmitting circuit is caused to issue a train of pulses, operating circuit means connecting said transmitter contact means through respective contacts of said banks and through said respective slide contacts with said drive means for controlling said drive means to advance said stepping switch mechanism during a first portion of said cycle from said zero position to a step position indicative of said desired number, releasable locking means engageable with said selector contact means for holding each actuated contact means in actuated position, said locking means having a release circuit connected with said operating circuit means for releasing said actuated contact means in said step position of said stepping mechanism, resetting circuit means connecting said drive means with said selector contact means for advancing said mechanism during a second portion of said cycle from said step position to said zero position, and a control relay dependent upon the position of said selector contact means and connected in said pulse transmitting circuit to close said latter circuit during only one of said two cycle portions.

12. Control apparatus for issuing trains of pulses in accordance with control magnitudes, comprising a pulse transmitter having a number of selector contact means corresponding to the respective digits of the magnitude to be transmitted and having a pulse issuing stepping switch mechanism, said mechanism having switch units for said respective digits, each unit comprising a bank of contacts and a progressively movable slide contact sequentially engageable with the contacts of said bank, said mechanism having a stepping drive common to said slide contacts and having a pulse contact operative once for each step of said drive, operating circuit means connecting said drive with said selector contact means and extending through said switch units for operating said drive, said units being sequentially arranged whereby said pulse contact during operation of said drive issues a total number of pulses corresponding to the sum value of said digits, and a pulse storing device having a single stepping switch connected with said pulse contact and having a number of consecutive steps equal to the expectable maximum of said sum value.

References Cited in the file of this patent

UNITED STATES PATENTS

| Number | Name | Date |
|---|---|---|
| 911,932 | Atwood | Feb. 9, 1909 |
| 1,976,548 | Field | Oct. 9, 1934 |
| 2,053,749 | Steeneck | Sept. 8, 1936 |
| 2,346,869 | Poole | Apr. 18, 1944 |
| 2,403,873 | Mumma | July 9, 1946 |
| 2,622,144 | Jensen | Dec. 16, 1952 |